(12) United States Patent
Liao et al.

(10) Patent No.: US 6,776,697 B2
(45) Date of Patent: Aug. 17, 2004

(54) ROTARY WOODWORKING MACHINE

(76) Inventors: Juei-Seng Liao, No. 295, Sec. 1, Nanking E. Rd., Taichung City (TW); Pei-Lieh Chiang, No. 12, Nan-Ping Rd., Nan Dist., Taichung City (TW)

(*) Notice: Subject to any disclaimer, the term of this patent is extended or adjusted under 35 U.S.C. 154(b) by 226 days.

(21) Appl. No.: 10/214,683

(22) Filed: Aug. 7, 2002

(65) Prior Publication Data

US 2003/0232673 A1 Dec. 18, 2003

(30) Foreign Application Priority Data

Jun. 13, 2002 (TW) .......................................... 91208831

(51) Int. Cl.⁷ .............................................. B24B 7/00
(52) U.S. Cl. ........................ 451/65; 451/178; 451/299; 451/461
(58) Field of Search .......................... 451/65, 178, 299, 451/461, 231, 296, 411

(56) References Cited

U.S. PATENT DOCUMENTS

| | | | | |
|---|---|---|---|---|
| 2,793,473 A | * | 5/1957 | Hickman | 451/65 |
| 2,797,533 A | * | 7/1957 | Bluemink | 451/226 |
| 2,948,088 A | * | 8/1960 | Jepson | 451/340 |
| 3,027,688 A | * | 4/1962 | Zabransky | 451/65 |
| 3,088,248 A | * | 5/1963 | Strzoda | 451/231 |
| 3,879,896 A | * | 4/1975 | Maxfield et al. | 451/65 |
| 4,305,231 A | * | 12/1981 | Rasmussen | 451/65 |
| 4,335,542 A | * | 6/1982 | Howe | 451/65 |
| 4,461,121 A | * | 7/1984 | Motzer et al. | 451/5 |
| 4,590,711 A | * | 5/1986 | Sollami | 451/24 |
| 5,168,656 A | * | 12/1992 | Jolly et al. | 451/310 |
| 5,199,220 A | * | 4/1993 | Steiner et al. | 451/65 |
| 5,311,703 A | * | 5/1994 | Ketteringham | 451/65 |
| 5,725,418 A | * | 3/1998 | Giebmanns | 451/65 |
| 5,888,123 A | * | 3/1999 | Wang | 451/65 |
| 6,095,906 A | * | 8/2000 | Wang | 451/65 |
| 6,244,938 B1 | * | 6/2001 | Ploeger | 451/65 |
| 6,511,366 B1 | * | 1/2003 | Liao et al. | 451/65 |

* cited by examiner

*Primary Examiner*—M. Rachuba
(74) *Attorney, Agent, or Firm*—Christie, Parker & Hale, LLP (57) ABSTRACT

A rotary woodworking machine includes a longitudinally extending transmitting shaft having two ends respectively coupled to two rotary woodworking members. A speed ratio varying device is disposed to couple the transmitting shaft to an output shaft of a motor, and includes two pitch-variable first and second pulleys mounted on the transmitting shaft and the output shaft, a belt trained on the pulleys, and a control unit operable to move a movable disc of the first pulley toward or away from a fixed disc of the first pulley so as to vary the radial distances between the belt and each of the shafts, thereby varying the speed ratio of the transmitting shaft to the output shaft.

5 Claims, 7 Drawing Sheets

ROTARY WOODWORKING MACHINE

CROSS-REFERENCE TO RELATED APPLICATION

This application claims priority of Taiwanese Application No. 091208831, filed on Jun. 13, 2002.

BACKGROUND OF THE INVENTION

1. Field of the Invention

This invention relates to a rotary woodworking machine, more particularly to a rotary woodworking machine with a speed ratio varying device for a transmitting shaft which is driven by an output shaft of a motor.

2. Description of the Related Art

A conventional rotary woodworking machine, such as one having a sand-belt and pulley assembly, an emery wheel, or a sanding drum, generally includes a gear box in which a plurality of different gears are operably coupled to a motor and a transmitting shaft for varying the rotational speed of an output end of the transmitting shaft. However, since the rotational speed of the transmitting shaft depends on the coupling of the different gears, it cannot be freely varied. Moreover, the noise generated during gear change is loud, and the gear box is bulky, which are disadvantageous.

SUMMARY OF THE INVENTION

The object of the present invention is to provide a rotary woodworking machine which has a noiseless speed ratio varying device for a transmitting shaft and which permits the transmitting shaft to rotate at a desired speed.

According to this invention, the rotary woodworking machine includes a machine frame with first and second walls opposite to each other in a longitudinal direction. A motor has an output shaft extending along and rotatable about a first axis parallel to the longitudinal direction to deliver a drive force. The output shaft has a coupling end disposed between the first and second walls. A transmitting shaft extends along and is rotatable about a second axis parallel to the first axis, and has first and second ends which extend outwardly of the first and second walls, respectively, and a middle portion between the first and second ends. First and second rotary woodworking members are coupled to and are rotatable with the first and second ends of the transmitting shaft, respectively.

A speed ratio varying device includes first and second pulleys, a control unit, and a belt. The first pulley has a first fixed disc which is mounted securely on the middle portion, and a first movable disc which is splined to the middle portion to be movable relative to the first fixed disc along the second axis. The first fixed and movable discs respectively have first belt-engaging surfaces which cooperatively define therebetween a first belt receiving space. The control unit is mounted on the machine frame, and has an operable member which is turnable to move the first movable disc along the second axis toward or away from the first fixed disc. The second pulley has a second fixed disc which is mounted securely on the coupling end, and a second movable disc which is splined to the coupling end to be movable relative to the second fixed disc along the first axis. The second fixed and movable discs respectively have second belt-engaging surfaces which cooperatively define therebetween a second belt receiving space. A biasing member is disposed to bias the second movable disc toward the second fixed disc. The belt is trained on the first and second pulleys, and is frictionally slidable on the first and second belt-engaging surfaces. The belt has a first lengthwise end which cooperates with the middle portion to define a first radial distance therebetween, and a second lengthwise end which is opposite to the first lengthwise end in a direction transverse to the longitudinal direction and which cooperates with the coupling end to define a second radial distance therebetween. Turning of the operable member results in movement of the first movable disc along the second axis between first and second positions. In the first position, the first movable disc is closer to the first fixed disc so that the first lengthwise end is remote from the middle portion so as to result in a greater length of the first radial distance, and the second movable disc is kept apart from the second fixed disc by a tension force which is generated as a result of displacement of the second lengthwise end toward the coupling end of the output shaft and which acts against biasing action of the biasing member. In the second position, the first movable disc is remote from the first fixed disc so that the first lengthwise end is proximate to the middle portion so as to result in a smaller length of the first radial distance, and the second movable disc is held close to the second fixed disc by the biasing action of the biasing member.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Referring to FIGS. 1 to 4, the preferred embodiment of a rotary woodworking machine according to the present invention is shown to comprise a machine frame 10 which has first and second walls 12 opposite to each other in a longitudinal direction (indicated by (X)), a front wall 13 which is interposed between the first and second walls 12 and which has a transparent portion 131, and a positioning plate 14 which extends from the first wall 12 in the longitudinal direction.

A drive transmission mechanism 20 includes a motor 23 with an output shaft 231 which extends along and which is rotatable about a first axis parallel to the longitudinal direction to deliver a drive force. The output shaft 231 has a coupling end which is disposed between the first and second walls 12 and proximate to the first wall 12. A transmitting shaft 22 extends along and is rotatable about a second axis parallel to the first axis, and has first and second ends 221,222 which extend outwardly of the first and second walls 12, respectively, and a middle portion 223 which is disposed between the first and second ends 221,222. An upright shaft 21 is mounted to the machine frame 10, and extends along and is rotatable about an upright axis in a first direction (indicated by (Z)) transverse to the longitudinal direction. The upright shaft 21 has lower and upper ends which are respectively disposed under and above the transmitting shaft 22, and an intermediate portion 211 which is disposed between the lower and upper ends. A coupling member includes first and second threaded surfaces 224,212 which are formed on the middle portion 223 of the transmitting shaft 22 and the intermediate portion 211 of the upright shaft 21, respectively, to frictionally engage each other such that the rotational force of the transmitting shaft 22 is transmitted to rotate the intermediate portion 211 about the upright axis.

First, second, and third rotary woodworking members 100,200,300, such as a sand-belt and pulley assembly, an emery wheel, and a sanding drum, are coupled to and rotatable with the first and second ends 221,222 of the transmitting shaft 22 and the upper end of the upright shaft 21, respectively.

A speed ratio varying device includes a first pulley 30, a control unit, a second pulley 40, and a non-elastic belt 50.

The first pulley 30 has a first fixed disc 31 which is mounted securely on the middle portion 223 of the transmitting shaft 22, a first movable disc 32 which is splined to the middle portion 223 to be movable relative to the first fixed disc 31 along the second axis, and a bearing 33 which is sleeved on the first movable disc 32. The first fixed and movable discs 31,32 respectively have first belt-engaging surfaces 311,321 which cooperatively define therebetween a first belt receiving space.

Figure 7:
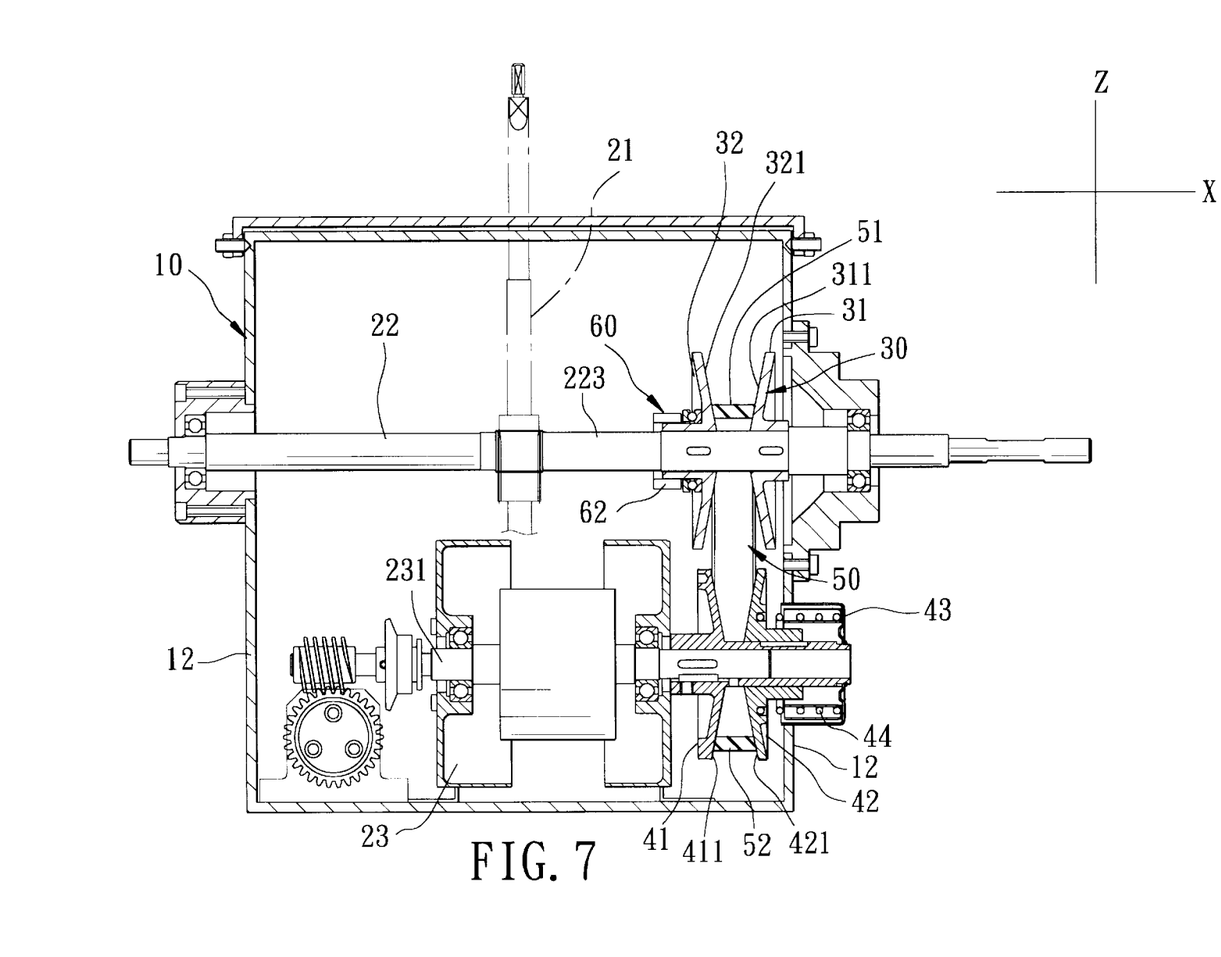
FIG. 7 is a view similar to FIG. 2 but showing the preferred embodiment in a state where the speed ratio of a transmitting shaft to an output shaft of a motor is varied.

The second pulley 40 has a second fixed disc 41 which is mounted securely on the coupling end of the output shaft 231, and a second movable disc 42 which is splined to the coupling end of the output shaft 231 to be movable relative to the second fixed disc 41 along the first axis. The second fixed and movable discs 41,42 respectively have second belt-engaging surfaces 411,421 which cooperatively define therebetween a second belt receiving space. With reference to FIG. 7, a positioning cap 43 is mounted on the first wall 12 for receiving a biasing member 44 to bias the second movable disc 42 toward the second fixed disc 41.

Figure 3:
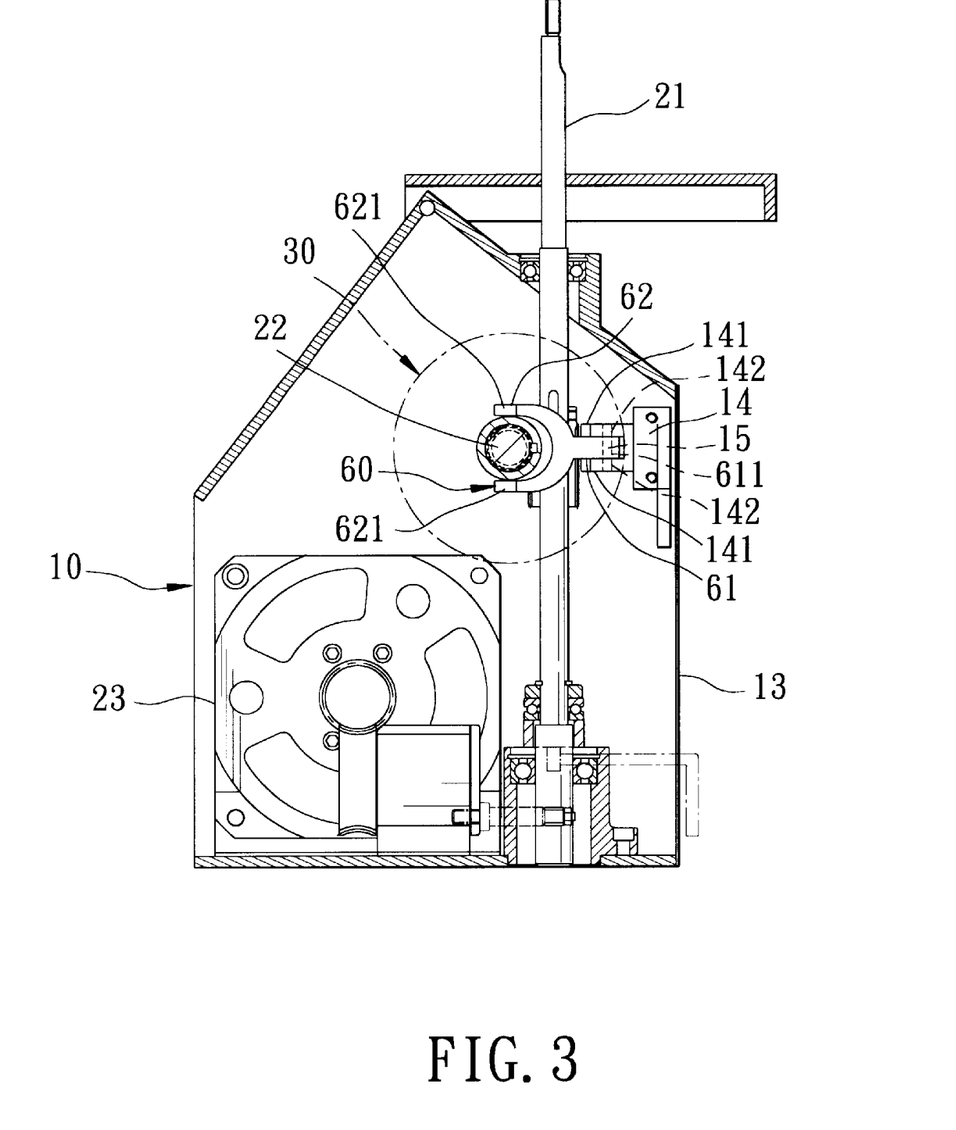
FIG. 3 is a partly sectional view of the preferred embodiment viewed from a lateral side thereof.
Figure 4:
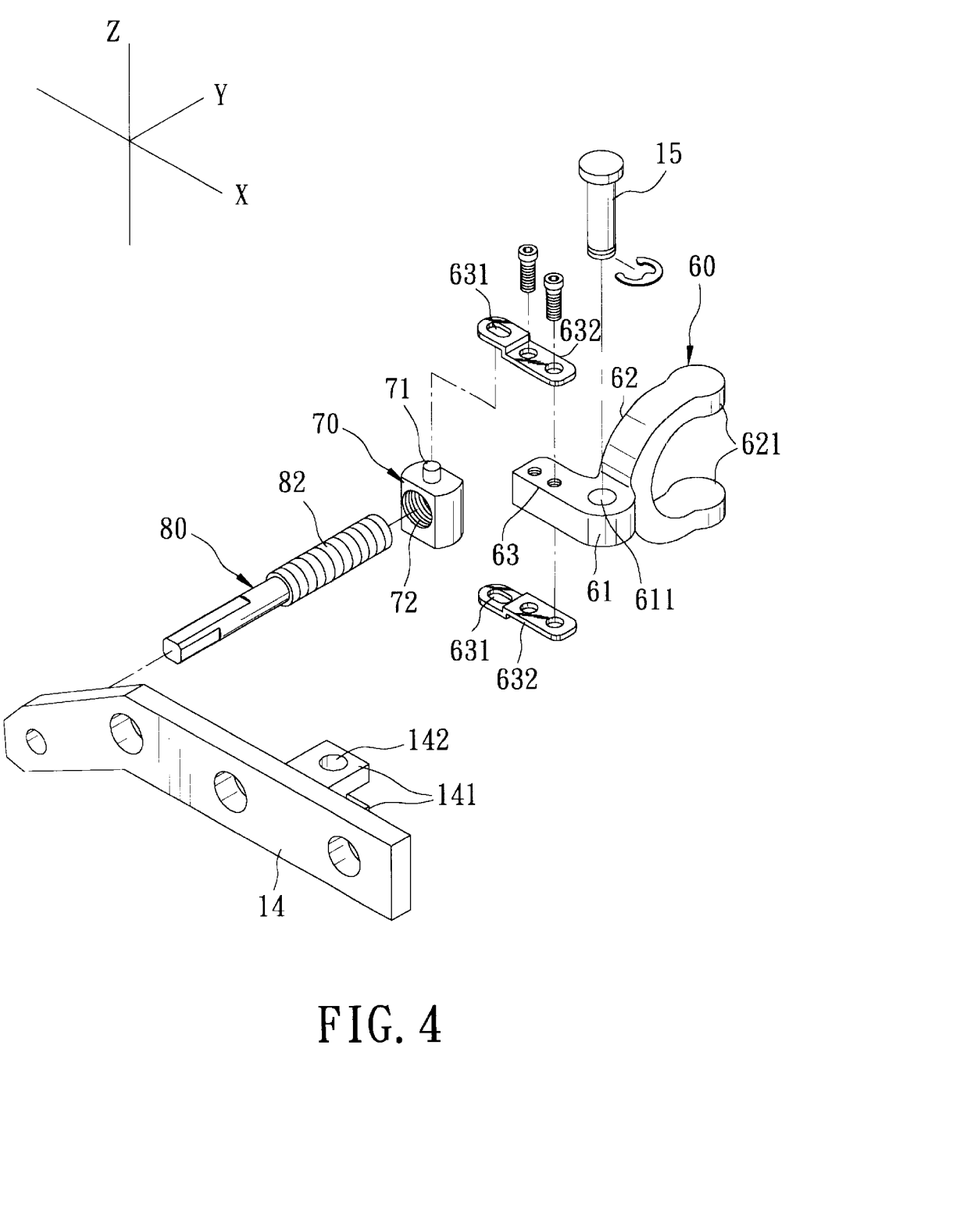
FIG. 4 is an exploded perspective view of a control unit of the preferred embodiment.

As shown in FIGS. 3 and 4, the control unit includes a crank 60, a screw nut 70, and an operable member 80. The crank 60 has a middle pivot portion 61 with a pivot hole 611 which is pivotally mounted between two lugs 141 disposed on the positioning plate 14 by means of a pivot pin 15 that extends through holes 142 formed in the lugs 141 and the pivot hole 611 along a pivot axis in the first direction. The crank 60 further has a C-shaped pressing end 62 which has two prongs 621 spacedly surrounding the middle portion 223 of the transmitting shaft 22 and which abuts against the bearing 33, and an actuated end 63 which extends from the middle pivot portion 61 radial to the pivot axis and which cooperates with the pressing end 62 to confine an included angle not larger than 180 degrees. The actuated end 63 is provided with two lug plates 632 which are secured thereon and which respectively have elongate holes 631 formed therein. As such, referring further to FIGS. 5 and 6, a rotational motion of the actuated end 63 about the pivot axis results in movement of the pressing end 62 which, in turn, moves the bearing 33 and the first movable disc 32 along the second axis.

The screw nut 70 is loosely mounted on the actuated end 63 in such a manner that two pins 71 (only one is shown) formed on the screw nut 70 are inserted into the elongate holes 631, and has an internally threaded portion 72 which extends in a second direction (indicated by (Y)) transverse to the longitudinal and first directions.

The operable member 80 is in the form of a threaded bolt which extends in the second direction and which has an operating end that is provided with a rotary knob 81 (see FIG. 1), and an externally threaded end 82 that engages threadedly the internally threaded portion 72 of the screw nut 70 so as to move the screw nut 70 in the second direction when the rotary knob 81 is rotated, thereby turning the actuated end 63 of the crank 60 about the pivot axis. Therefore, as described above, the first movable disc 32 can be moved along the second axis to be disposed close to or remote from the first fixed disc 31.

Referring back to FIG. 2, the non-elastic belt 50 is trained on the first and second pulleys 30,40, and is frictionally slidable on the first and second belt-engaging surfaces 311,321,411,421. The belt 50 has a first lengthwise end 51 which cooperates with the middle portion 223 of the transmitting shaft 22 to define a first radial distance therebetween, and a second lengthwise end 52 which is opposite to the first lengthwise end 51 in the first direction and which cooperates with the coupling end of the output shaft 231 to define a second radial distance therebetween. In addition, each of the first and second belt-engaging surfaces 311,321,411,421 diverges from the respective one of the middle portion 223 and the coupling end of the output shaft 231 to the respective one of the first and second lengthwise ends 51,52 in the first direction. The belt 50 has a V-shaped cross-section.

Figure 2:
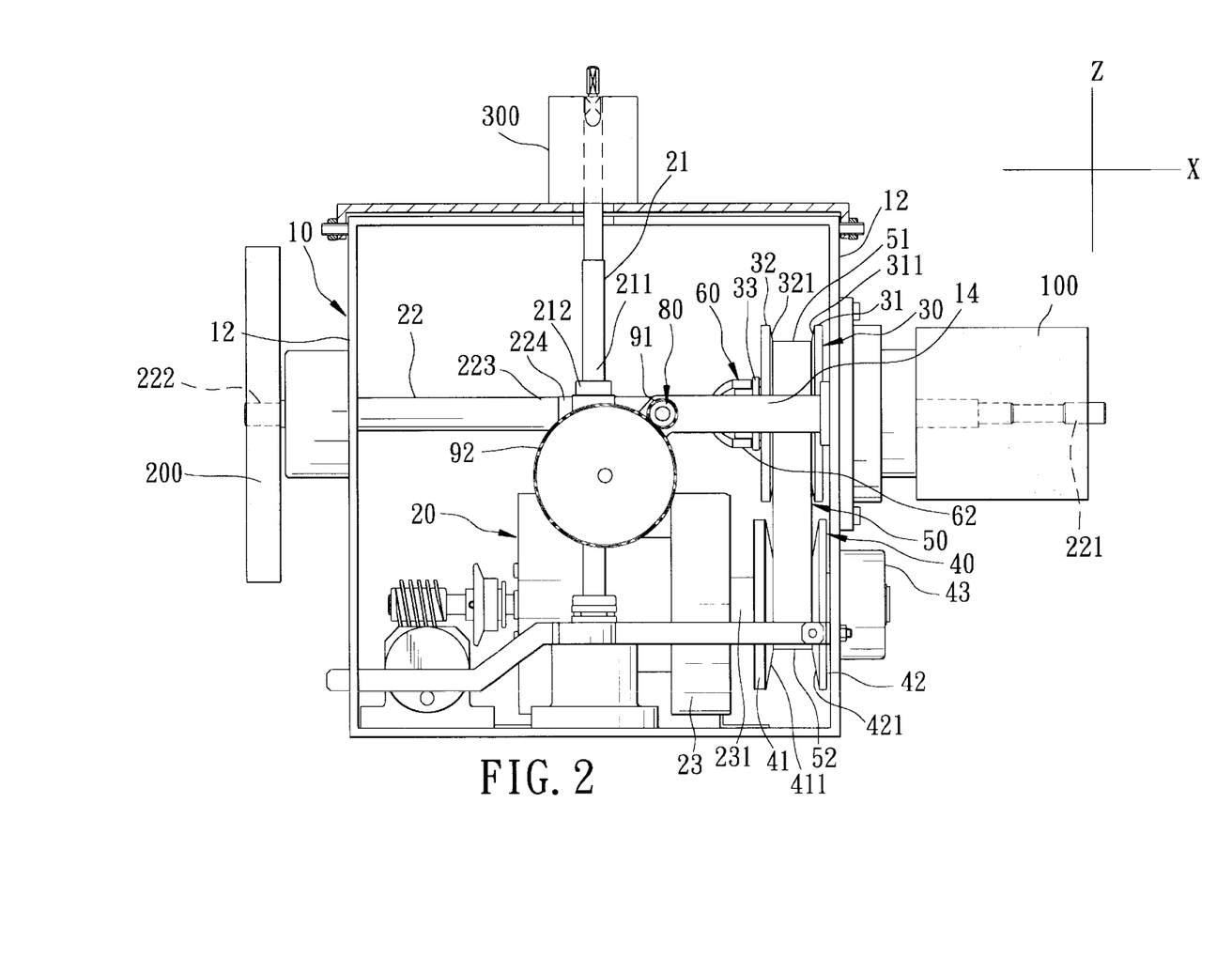
FIG. 2 is a partly sectional view of the preferred embodiment viewed from a front side thereof.
Figure 5:
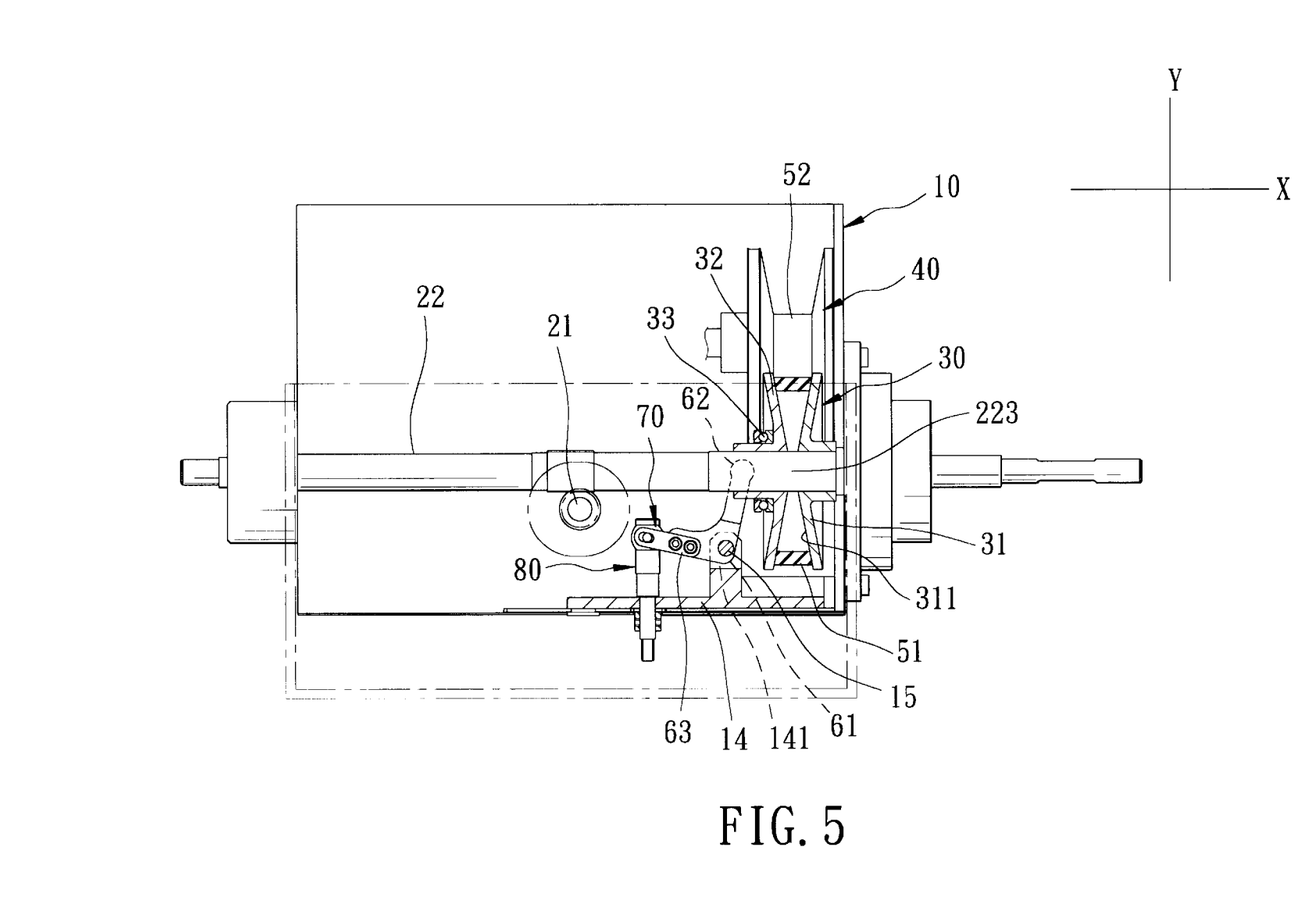
FIG. 5 is a partly sectional view of the preferred embodiment taken from a top thereof and in a state where the control unit is operated to press a movable disc.
Figure 6:
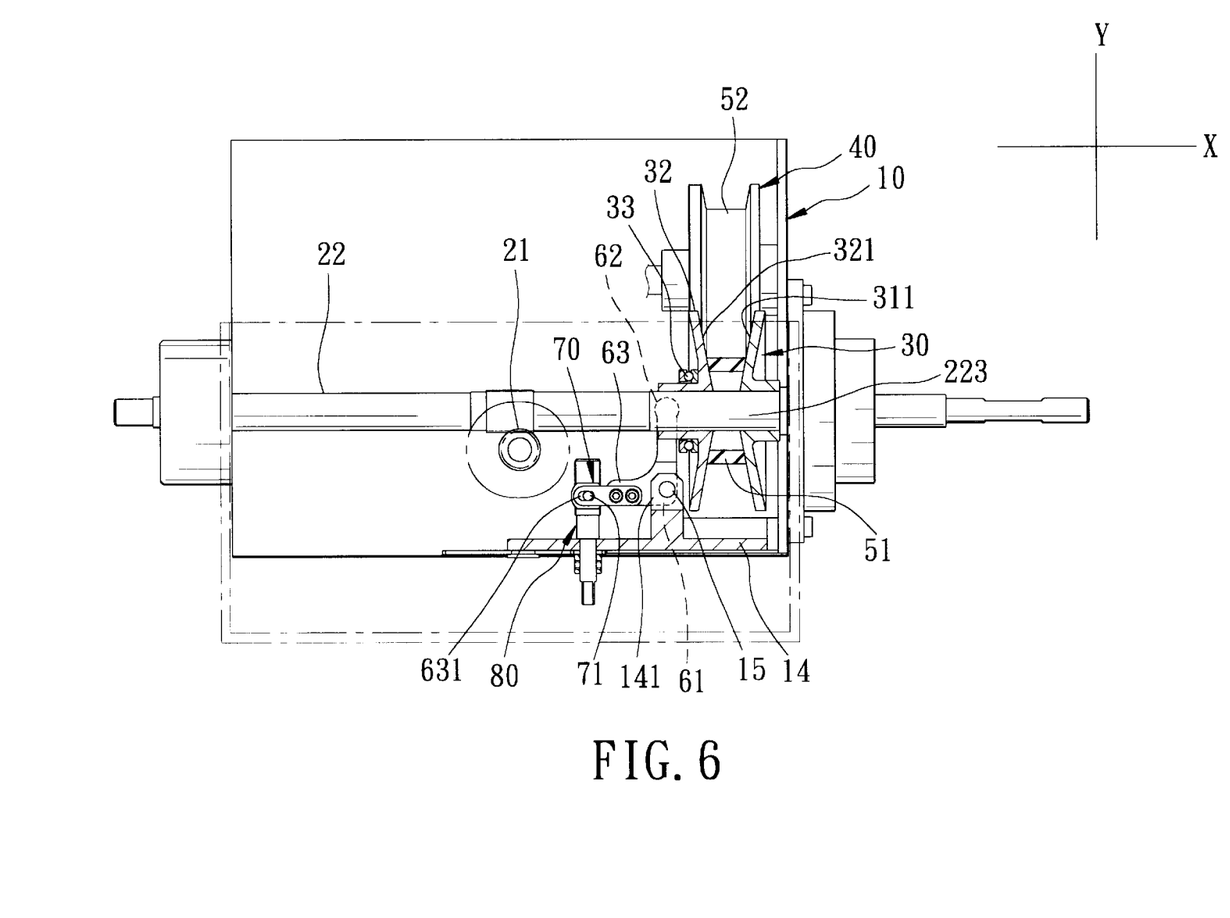
FIG. 6 is a view similar to FIG. 5 but showing the preferred embodiment in a state where the control unit is not operated.

As illustrated, turning of the operable member 80 results in movement of the first movable disc 32 along the second axis between first and second positions. As shown in FIGS. 2 and 5, in the first position, the first movable disc 32 is disposed close to the first fixed disc 31 so that the first lengthwise end 51 is remote from the middle portion 223 so as to result in a greater length of the first radial distance and a smaller length of the second radial distance, and the second movable disc 42 is kept apart from the second fixed disc 41 by a tension force which is generated as a result of displacement of the second lengthwise end 52 toward the coupling end of the output shaft 231 and which acts against biasing action of the biasing member 44. As such, the pulleys 30,40 operate like a small gear that drives a large gear, thereby permitting the transmitting shaft 22 to have a lower speed than that of the output shaft 231. As shown in FIGS. 6 and 7, in the second position, the first movable disc 32 is remote from the first fixed disc 31 so that the first lengthwise end 51 is proximate to the middle portion 223 so as to result in a smaller length of the first radial distance and a greater length of the second radial distance, and the second movable disc 42 is held closer to the second fixed disc 41 by the biasing action of the biasing member 44. As such, the pulleys 30,40 operate like a large gear that drives a small gear, thereby permitting the transmitting shaft 22 to have a higher speed than that of the output shaft 231.

Figure 1:
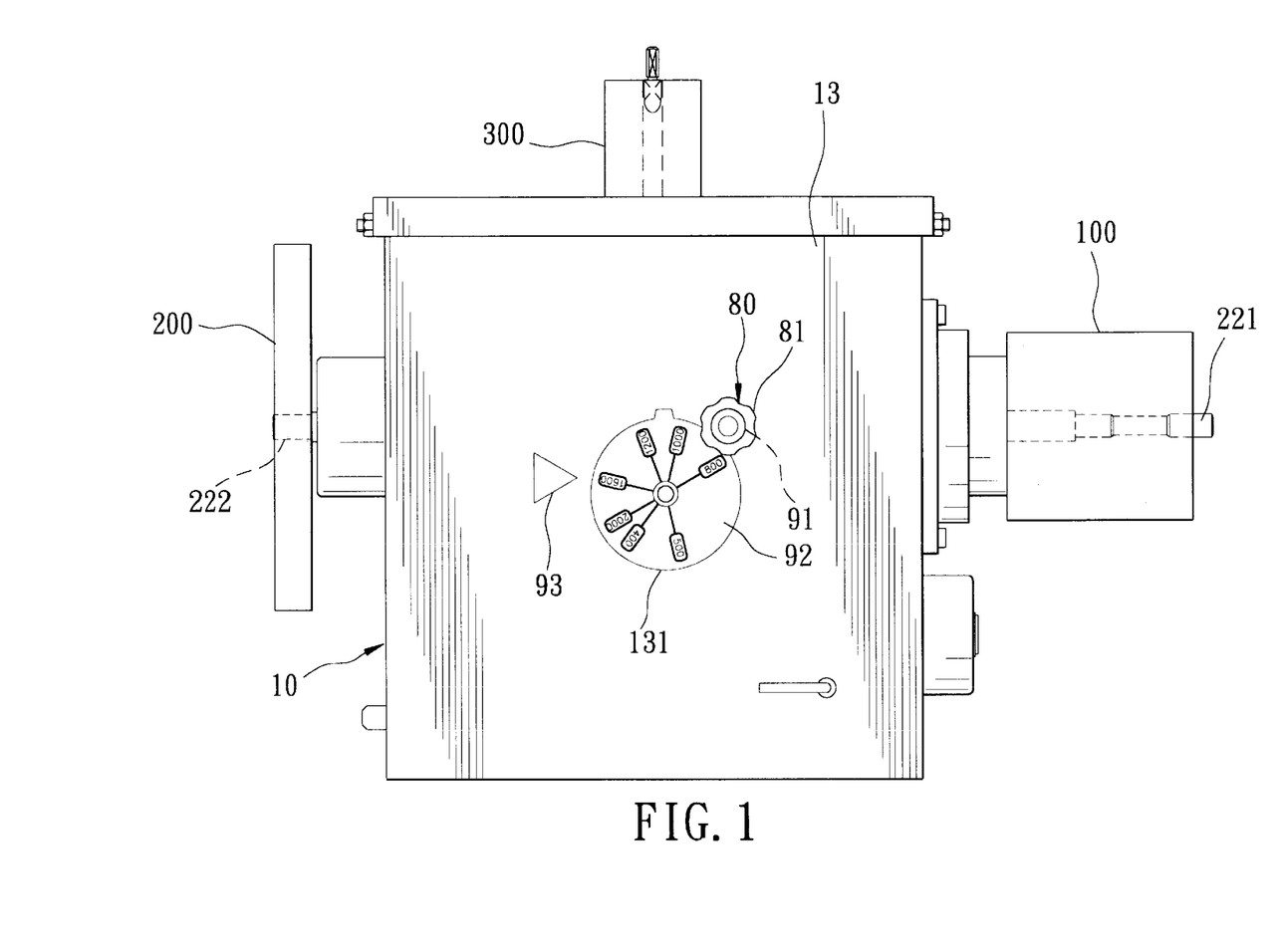
FIG. 1 is a perspective view of a preferred embodiment of a rotary woodworking machine according to this invention.

In addition, as shown in FIGS. 1 and 2, a pinion 91 is mounted to be coaxially rotated with the rotary knob 81. A toothed wheel 92 is mounted on the machine frame 10 at a position corresponding to the transparent portion 131 so as to be visible therethrough, and is meshed with the pinion 91 so as to rotate the toothed wheel 92 during turning of the operable member 80. A pointing sign 93 is marked on the front wall 13 adjacent to the toothed wheel 92. The toothed wheel 92 has a major surface marked with graduations thereon for indicating the rotational speed of the transmitting shaft 22.

With a construction as such, the operator only needs to turn the operable member 80 through a predetermined angle which can be determined with reference to the graduations on the toothed wheel 92 to vary the speed ratio of the transmitting shaft 22 to the output shaft 231 so as to change freely the rotational speed of the transmitting shaft 22. Since no gear wheels are employed in the rotary woodworking machine of this invention, no noise is generated during change of the rotational speed of the transmitting shaft 22. Thus, the aforesaid drawbacks as encountered in the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. A rotary woodworking machine comprising:
    a machine frame having first and second walls opposite to each other in a longitudinal direction;
    a motor with an output shaft extending along and rotatable about a first axis parallel to the longitudinal direction to deliver a drive force, said output shaft having a coupling end which is disposed between said first and second walls;
    a transmitting shaft extending along and rotatable about a second axis parallel to the first axis, and having first and second ends which extend outwardly of said first and second walls, respectively, and a middle portion which is disposed between said first and second ends;
    first and second rotary woodworking members coupled to and rotatable with said first and second ends of said transmitting shaft; and
    a speed ratio varying device including
        a first pulley having a first fixed disc which is mounted securely on said middle portion, and a first movable disc which is splined to said middle portion to be movable relative to said first fixed disc along the second axis, said first fixed and movable discs respectively having first belt-engaging surfaces which cooperatively define therebetween a first belt receiving space,
        a control unit mounted on said machine frame, and having an operable member which is turnable to move said first movable disc along the second axis so as to be disposed close to or remote from said first fixed disc,
        a second pulley having a second fixed disc which is mounted securely on said coupling end, and a second movable disc which is splined to said coupling end to be movable relative to said second fixed disc along the first axis, said second fixed and movable discs respectively having second belt-engaging surfaces which cooperatively define therebetween a second belt receiving space,
        a biasing member disposed to bias said second movable disc toward said second fixed disc, and
        a belt trained on said first and second pulleys, and frictionally slidable on said first and second belt-engaging surfaces, said belt having a first lengthwise end which cooperates with said middle portion to define a first radial distance therebetween, and a second lengthwise end which is opposite to said first lengthwise end in a first direction transverse to the longitudinal direction and which cooperates with said coupling end to define a second radial distance therebetween such that, turning of said operable member results in movement of said first movable disc along the second axis between
            a first position, where said first movable disc is close to said first fixed disc so that said first lengthwise end is remote from said middle portion so as to result in a greater length of the first radial distance, and where said second movable disc is kept apart from said second fixed disc by a tension force which is generated as a result of displacement of said second lengthwise end toward said coupling end of said output shaft and which acts against biasing action of said biasing member, and
            a second position, where said first movable disc is remote from said first fixed disc so that said first lengthwise end is proximate to said middle portion so as to result in a smaller length of the first radial distance, and where said second movable disc is held close to said second fixed disc by the biasing action of said biasing member.

2. The rotary woodworking machine of claim 1, wherein said control unit includes
    a crank having a middle pivot portion which is pivotally mounted on said machine frame about a pivot axis in the first direction, a pressing end and an actuated end which extend from said middle pivot portion radial to the pivot axis and which are disposed proximate to and distal from said first movable disc in the longitudinal direction, respectively, such that a rotational motion of said actuated end about the pivot axis results in movement of said pressing end which in turn, moves said first movable disc between the first and second positions,
    a screw nut loosely mounted on said actuated end, and having an internally threaded portion which extends in a second direction transverse to the longitudinal and first directions, and
    said operable member being in form of a threaded bolt which extends in the second direction and which has an operating end that is provided with a rotary knob, and an externally threaded end that engages threadedly said internally threaded portion so as to move said screw nut in the second direction when said rotary knob is rotated, thereby turning said actuated end about the pivot axis.

3. The rotary woodworking machine of claim 2, further comprising
    a pinion mounted to be coaxially rotated with said rotary knob, and
    a toothed wheel mounted on said machine frame and meshed with said pinion, said toothed wheel having a major surface marked with graduations thereon for indicating a speed ratio of said output shaft to said transmitting shaft.

4. The rotary woodworking machine of claim 1, wherein each of said first and second belt-engaging surfaces diverges from a respective one of said middle portion and said coupling end to a respective one of said first and second lengthwise ends in the first direction, said belt having a V-shaped cross-section.

5. The rotary woodworking machine of claim 1, further comprising
    an upright shaft mounted to said machine frame, and extending along and rotatable about an upright axis in the first direction, said upright shaft having lower and upper ends which are respectively disposed under and above said transmitting shaft, and an intermediate portion which is disposed between said lower and upper ends, a third rotary woodworking member coupled and rotatable with said upper end of said upright shaft, and a coupling member disposed between said middle and intermediate portions so as to couple said intermediate portion to said middle portion such that said upright shaft is driven by a rotational force of said transmitting shaft to rotate about the upright axis.

* * * * *